A. N. THOMAS.
HINGE.
APPLICATION FILED SEPT. 4, 1908.
915,905.
Patented Mar. 23, 1909.
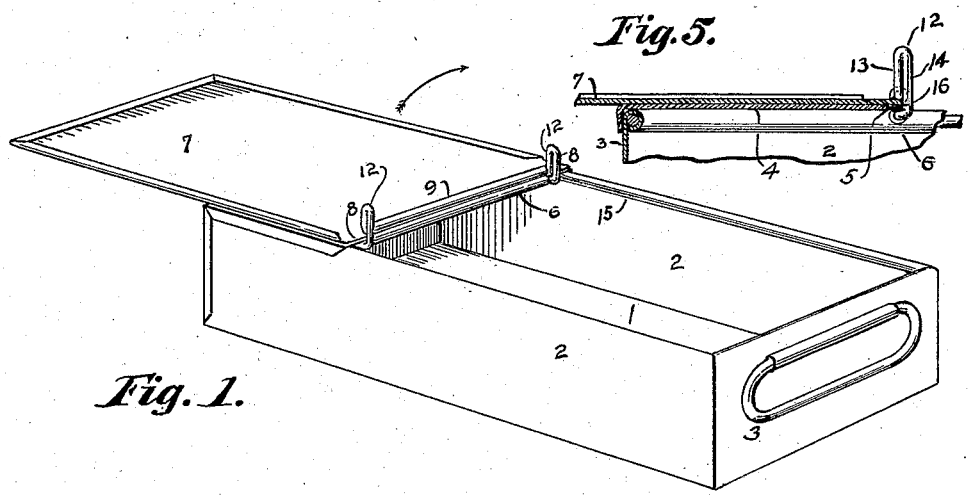
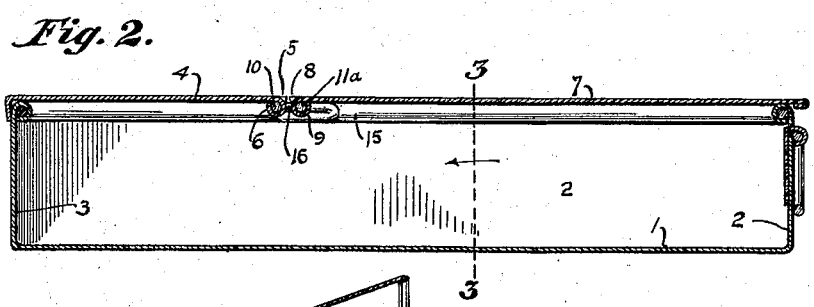
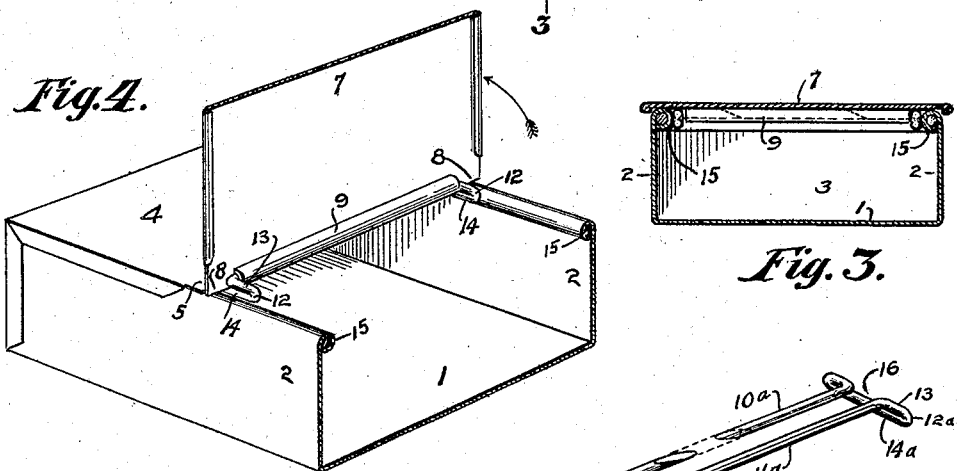
WITNESSES
Jos. J. Hosler.
Ruth A. Miller.
INVENTOR
Arvine N. Thomas,
BY Harry Frease.
ATTORNEY

UNITED STATES PATENT OFFICE.

ARVINE N. THOMAS, OF CANTON, OHIO.

HINGE.

No. 915,905.        Specification of Letters Patent.        Patented March 23, 1909.

Application filed September 4, 1908. Serial No. 451,664.

*To all whom it may concern:*

Be it known that I, ARVINE N. THOMAS, a citizen of the United States, residing at Canton, in the county of Stark and State of Ohio, have invented a new and useful Improvement in Hinges, of which the following is a specification.

The invention relates to a hinge for the fixed and lid parts of the flat cover of a box suitable for use in safe deposit vaults. Boxes of this character are usually made of sheet metal and are preferably formed somewhat narrow with reference to their length, and somewhat shallow with reference to their width; and the cover of the box is usually divided into a fixed part, ordinarily the rear portion, which is secured to or formed integral with the sides and rear end of the box, and a lid part, ordinarily the forward portion, which is hinged at its rear end edge to the forward free edge of the fixed part of the cover. Such boxes are usually intended and adapted to be entered into pigeonholes or other suitable receptacles shaped to neatly receive the individual boxes, and therefore it is desirable that when the lid is closed it should lie flat and flush with the fixed part of the cover. It is also desirable that the lid should be hinged so as to fold over and lie flat on the fixed cover, and for this operation it is desirable that the adjacent edges of the fixed and lid parts of the cover shall be shaped smooth and straight and without any angles or recesses therein, and that they shall not rub against each other to abrade or deface the enamel with which the boxes are usually finished.

The general object of the invention is accomplished by forming a barrel bearing on each adjacent edge of the fixed cover and the lid, in which bearings are journaled two parallel pintles, the ends of the pintles being connected together by yokes which are bent or deflected to one side in such a manner as to form a tongue which is adapted to operate against the lid to draw the same downward into alinement with the plane of the fixed cover when the lid is rotated forward and closed.

A further object of the invention is to make the parallel pintles in two separate sections, the outer ends of each pair being connected together by the respective yokes, and to bevel and overlap the ends of the respective pintle sections so that when entered in the bearings, one piece cannot turn without the other; which arrangement permits the pintles to be inserted in the ends of the bearings after the bearings are formed, and at the same time to retain the advantages of one-piece pintles.

The various features of the invention which are thus set forth in general terms, are illustrated in the accompanying drawings, forming part hereof, in which—

Figure 1 is a perspective view of the box showing the lid open and rotated backward; Fig. 2, a longitudinal-vertical section of the box showing the lid closed; Fig. 3, a cross section of the box on line 3—3, Fig. 2; Fig. 4, a perspective cross sectional view of the rear end of the box, showing the normal operation of the hinge when the lid is being opened; Fig. 5, a longitudinal-vertical section of the fixed cover showing the lid folded backward thereon; and Fig. 6, a detached perspective view of the two pintle parts slightly separated, and showing a modified form of the yokes.

Similar numerals refer to similar parts throughout the drawings.

The bottom 1, the sides 2 and the ends 3 of the box are preferably formed of sheet metal, and the fixed rear part 4 of the cover is formed or attached on the sides and rear end of the box in any well-known manner. The middle portion of the forward free end portion of the fixed cover is originally extended beyond the extreme side portions 5 thereof and this extended portion is curved downward, rearward and upward to form the barrel bearing 6; and the middle portion of the normally rear end of the lid 7 is likewise originally extended beyond the extreme side portions 8 thereof, and this extended portion is curved downward, forward and thence upward to form the barrel bearing 9.

Two parallel pintles are journaled respectively in the barrel bearings 6 of the fixed part and 9 of the lid of the cover, and these pintles are each preferably formed in two sections of unequal length, as 10, 10$^a$ and 11, 11$^a$, and when so made the longer section of one pintle is preferably located opposite the shorter section of the other pintle. The adjacent ends of the respective sections are preferably beveled and adapted to overlap each other when abutted, so that when entered in the bearings one section is held against rotation with reference to the other. The outer ends of the pintles are connected together by means of the yokes 12, the arms 13 of the yokes which are connected with the lid pintle being bent and extended directly forward from this pintle in the plane passing through both pintles, having reference to the normal position of the parts when the lid is closed; and the arms 14 of the fixed cover pintle are first bent downward and then forward along the lower side of the arms of the lid pintle.

The hinge parts are preferably assembled before the fixed cover is attached to the box, and this is conveniently accomplished by inserting the respective end sections of the pintles into the opposite ends of the barrels, whereupon the fixed and lid parts of the box are placed in position. The length of the bearings and the pintles are preferably arranged so that the outer sides of the yoke arms will abut the inner sides of the beads 15 which are preferably formed on the edges of the sides of the box, and so that the outer ends of the barrels will abut the inner sides of the yoke arms; and by this arrangement it is evident that the pintle sections will always be retained in proper position after the fixed cover has been attached to the box. In the normal operation of the hinge thus described, when the lid is opened by rotating it upward and backward, either the lid bearing or the fixed cover pintle can rotate, and in so doing the side portions 5 and 8 of the hinge ends of the cover parts enter the recesses 16 between the ends of the pintles, wherein the respective edges ultimately abut the normally upper sides of the rear yoke arms and constitute stops which prevent the bearing or pintle from rotating more than a quarter turn; and as a result of this arrangement, the adjacent edges of the cover parts never abut or abrade each other, and when the lid has been folded over backward, the lid bearing and the fixed cover pintle will have each rotated a quarter turn and the yokes will have been turned from their normal forward horizontal position, as shown in Figs. 2, 3 and 4, to an upright position, as shown in Figs. 1 and 5. And, when the lid is closed by rotating it upward and forward, either bearing or pintle can rotate as before, but when the lid bearing has rotated a quarter turn on its pintle, the lid will abut the adjacent arms of the yokes which thereby stop a further rotation of the lid bearing on its pintle, whereby the complete half circle rotation of the lid in being closed causes a quarter rotation of the lid bearing and the fixed cover pintle, and the lid is thereby brought into alinement with the fixed part of the cover.

It is evidently not essential to make the pintles in two separate sections as illustrated and described herein, but it is preferable to make them in this manner for convenience in assembling the parts. Furthermore, if it is not desirable or necessary to overlap the adjacent ends of the pintle sections, the same pintles can evidently be employed in hinges for boxes of various widths. And it will be seen that by the construction and arrangement of the hinge parts herein set forth, the yokes which connect the ends of the pintles serve also as means for alining the cover sections when the lid is closed; so that it is not necessary to cut or encumber the bearing or the pintles with additional or special devices for this purpose. In the modified form of the yokes 12$^a$ illustrated in Fig. 6, the arms 14$^a$ which are connected with the fixed cover pintles are first bent directly backward in the normal position of the hinge so as to be in the rearward plane of the pintles, and are then bent downward and forward as before along the lower side of the arms of the lid pintle. With this modified form of the yokes, it is evident that the normally rear yoke-arms will abut the under side of the fixed cover part when the lid is closed, and will thus supplement the action of the forward yoke-arms in alining the two cover parts when the lid is closed. This feature has special value when the inner ends of the pintle sections are not arranged to abut or overlap, for the reason that the movements of each section of the pintles are thus made more nearly in unison.

What I claim as my invention, and desire to secure by Letters Patent, is—

1. A hinge for the fixed and lid parts of a flat box cover including bearings on the middle portions of the hinge-edges of the cover parts, parallel pintles journaled in the bearings, and yokes connecting the ends of the pintles, the lid-arms of the yokes being located in the plane of the pintles and in abutment with the lid when the same is closed, and the side portions of the hinge-edges of the cover parts being adapted to abut the opposite yoke-arm when the lid is opened.

2. A hinge for the fixed and lid parts of a flat box cover including bearings on the hinge-end portions of the cover parts, parallel pintles journaled in the bearings, and yokes connecting the ends of the pintles, the lid-arms of the yokes being located in the normally forward plane of the pintles whereby they abut the lid and aline it with the fixed cover when the lid is closed.

3. A hinge for the fixed and lid parts of a flat box cover including bearings on the hinge end portions of the cover parts, parallel pintles journaled in the bearings, and yokes connecting the ends of the pintles, the respective arms of the yokes being bent forward and rearward in the normal plane of the pintles whereby they abut and aline the lid and cover parts when the lid is closed.

ARVINE N. THOMAS.

Witnesses:
 JOSEPH FREASE,
 HARRY FREASE.